(12) United States Patent
Strelnikoff et al.

(10) Patent No.: US 12,450,436 B2
(45) Date of Patent: Oct. 21, 2025

(54) LANGUAGE PROCESSING FOR A VEHICLE

(71) Applicant: GM Global Technology Operations LLC, Detroit, MI (US)

(72) Inventors: Sasha Strelnikoff, Seattle, WA (US); Jiejun Xu, Diamond Bar, CA (US); Alireza Esna Ashari Esfahani, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 356 days.

(21) Appl. No.: 18/185,753

(22) Filed: Mar. 17, 2023

(65) Prior Publication Data

US 2024/0311566 A1   Sep. 19, 2024

(51) Int. Cl.
| | |
|---|---|
| *G06F 40/289* | (2020.01) |
| *B60K 35/10* | (2024.01) |
| *B60K 35/22* | (2024.01) |
| *G06F 40/205* | (2020.01) |
| *G06V 20/58* | (2022.01) |
| *G06V 30/262* | (2022.01) |

(52) U.S. Cl.
CPC ............ *G06F 40/289* (2020.01); *B60K 35/22* (2024.01); *G06F 40/205* (2020.01); *G06V 20/582* (2022.01); *G06V 30/262* (2022.01); *B60K 35/10* (2024.01); *B60K 2360/148* (2024.01)

(58) Field of Classification Search
CPC ... G06F 40/289; G06F 40/205; G06V 20/582; G06V 30/262; B60K 35/00; B60K 2360/148; B60K 35/10; B60K 35/22
See application file for complete search history.

(56) References Cited

U.S. PATENT DOCUMENTS

| | | | |
|---|---|---|---|
| 2016/0351051 A1* | 12/2016 | Murthy | G06V 20/588 |
| 2019/0102390 A1* | 4/2019 | Antunes | G06F 40/295 |
| 2019/0392231 A1* | 12/2019 | Dean | G06N 3/08 |
| 2022/0051665 A1* | 2/2022 | Bade | G06N 7/01 |
| 2023/0169273 A1* | 6/2023 | Koneru | G06F 40/30 |
| | | | 704/9 |
| 2024/0062108 A1* | 2/2024 | Pham | G06F 40/295 |

OTHER PUBLICATIONS

Dorash, Machine Learning vs, Rules Based Systems in NLP, 2017, Medium, whole document (Year: 2017).*
Wang, Scalable Representation Learning for Interpretable Classification, arXiv, 2021, whole document (Year: 2019).*
Chen et al. "Investigating Binary Neural Networks for Traffic Sign Detection and Recognition." 2021 IEEE Intelligent Vehicles Symposium, IEEE, 2021.

(Continued)

*Primary Examiner* — Sonia L Gay
(74) *Attorney, Agent, or Firm* — Vivacqua Crane, PLLC

(57) ABSTRACT

A method for language processing for a vehicle includes receiving an input text. The input text includes a plurality of words. The method also includes determining a rule-based action representation of the input text, parsing the input text to produce a parsed text. The method also includes determining a model-based action representation of the parsed text. The method also includes determining a final action representation of the input text based at least in part on the rule-based action representation and the model-based action representation.

17 Claims, 5 Drawing Sheets

(56) References Cited

OTHER PUBLICATIONS

Li et al. "Real-time traffic sign recognition based on efficient CNNs in the wild." IEEE Transactions on Intelligent TransportationSystems, 2018, pp. 975-984.

Luo, et al. "Traffic sign recognition using a multi-task convolutional neural network." IEEE Transactions on Intelligent Transportation Systems, 2017, pp. 1100-1111.

\* cited by examiner

LANGUAGE PROCESSING FOR A VEHICLE

INTRODUCTION

The present disclosure relates to systems and methods for language processing for a vehicle.

To increase occupant convenience and awareness, vehicles may be equipped with autonomous vehicle systems which are configured to provide to assist the occupant in operating the vehicle and/or autonomously operate the vehicle. Autonomous vehicle systems may use sensors, such as, for example, camera, radar, LiDAR, and/or the like to detect the surrounding environment and determine appropriate actions. Autonomous vehicle systems may also use optical character recognition (OCR) or similar techniques to recognize text on traffic signs and extract relevant information. However, current autonomous vehicle systems may not accurately determine the meaning of text on traffic signs, including important information or instructions to the occupant and complex logical conditions or statements.

Thus, while current autonomous vehicle systems and methods achieve their intended purpose, there is a need for a new and improved system and method for language processing for a vehicle.

SUMMARY

According to several aspects, a method for language processing for a vehicle is provided. The method includes receiving an input text. The input text includes a plurality of words. The method also includes determining a rule-based action representation of the input text, parsing the input text to produce a parsed text. The method also includes determining a model-based action representation of the parsed text. The method also includes determining a final action representation of the input text based at least in part on the rule-based action representation and the model-based action representation.

In another aspect of the present disclosure, determining the rule-based action representation further may include extracting a temporal condition from the input text. Determining the rule-based action representation further may include generating a logical negation condition expression based at least in part on a negation term in the input text. Determining the rule-based action representation further may include determining the rule-based action representation, where rule-based action representation includes at least the temporal condition and the logical negation condition expression.

In another aspect of the present disclosure, extracting the temporal condition from the input text further may include extracting a time from the input text using a first regular expression. Extracting the temporal condition from the input text further may include extracting a day from the input text using a second regular expression. Extracting the temporal condition from the input text further may include extracting a duration from the input text using a third regular expression. Extracting the temporal condition from the input text further may include generating the temporal condition based at least in part on the time, day, and duration extracted from the input text.

In another aspect of the present disclosure, parsing the input text further may include determining a part-of-speech tag of each of the plurality of words of the input text. The part-of-speech tag of at least one of the plurality of words of the input text is determined using a lookup table. The part-of-speech tag of at least one of the plurality of words of the input text is determined using a machine learning algorithm.

In another aspect of the present disclosure, determining the part-of-speech tag of each of the plurality of words of the input text further may include standardizing the input text to produce a standardized text. Each of a plurality of words of the standardized text is mapped to a corresponding one of the plurality of words of the input text. Determining the part-of-speech tag of each of the plurality of words of the input text further may include determining a standardized part-of-speech tag of each of a plurality of forced words of the plurality of words of the standardized text using the lookup table. Determining the part-of-speech tag of each of the plurality of words of the input text further may include determining a forced part-of-speech tag of each of a plurality of forced words of the plurality of words of the input text based on the standardized part-of-speech tag of the corresponding one of the plurality of forced words of the standardized text. Determining the part-of-speech tag of each of the plurality of words of the input text further may include determining a first plurality of part-of-speech taggings of the input text using the machine learning algorithm. Each of the first plurality of part-of-speech taggings includes a predicted part-of-speech tag for each of the plurality of words of the input text. Each of the first plurality of part-of-speech taggings has a confidence value. Determining the part-of-speech tag of each of the plurality of words of the input text further may include determining the part-of-speech tag of each of the plurality of words of the input text based at least in part on the confidence value of each of the first plurality of part-of-speech taggings and the plurality of forced words.

In another aspect of the present disclosure, Determining the part-of-speech tag of each of the plurality of words of the input text based at least in part on the confidence value of each of the first plurality of part-of-speech taggings and the plurality of forced words further may include determining a second plurality of part-of-speech taggings of the input text. The second plurality of part-of-speech taggings is a subset of the first plurality of part-of-speech taggings. The predicted part-of-speech tag of each forced word of the plurality of words of each of the second plurality of part-of-speech taggings is identical to the forced part-of-speech tag of each forced word of the plurality of words of each of the second plurality of part-of-speech taggings. Determining the part-of-speech tag of each of the plurality of words of the input text further may include generating a dependency parse tree for each of the second plurality of part-of-speech taggings of the input text. Determining the part-of-speech tag of each of the plurality of words of the input text further may include determining a third plurality of part-of-speech taggings of the input text. The third plurality of part-of-speech taggings is a subset of the second plurality of part-of-speech taggings. At least one forced word of the plurality of words of each of the third plurality of part-of-speech taggings is a root node of the dependency parse tree. Determining the part-of-speech tag of each of the plurality of words of the input text further may include determining the part-of-speech tag of each of the plurality of words of the input text based on one of the third plurality of part-of-speech taggings having a highest confidence value.

In another aspect of the present disclosure, determining the model-based action representation of the parsed text further may include identifying a plurality of action words in the input text. Determining the model-based action representation of the parsed text further may include processing each of the plurality of action words to determine a subject phrase and an object phrase for each of the plurality of action words. Action words closest to the root node of the dependency parse tree are processed first. Determining the model-based action representation of the parsed text further may include determining the model-based action representation. The model-based action representation includes at least the subject phrase and the object phrase for each of the plurality of action words.

In another aspect of the present disclosure, processing one of the plurality of action words to determine the subject phrase and the object phrase further may include generating a constituency parse tree of the input text based at least in part on the part-of-speech tag of each of the plurality of words of the input text. Processing one of the plurality of action words to determine the subject phrase and the object phrase further may include comparing the one of the plurality of action words to an exclusion list. Processing one of the plurality of action words to determine the subject phrase and the object phrase further may include identifying the subject phrase of the one of the plurality of action words using the constituency parse tree in response to determining that the one of the plurality of action words is not in the exclusion list. Processing one of the plurality of action words to determine the subject phrase and the object phrase further may include identifying the object phrase of the one of the plurality of action words using the constituency parse tree in response to determining that the one of the plurality of action words is not in the exclusion list. Processing one of the plurality of action words to determine the subject phrase and the object phrase further may include adding the subject phrase of the one of the plurality of action words to the exclusion list. Processing one of the plurality of action words to determine the subject phrase and the object phrase further may include adding the object phrase of the one of the plurality of action words to the exclusion list.

In another aspect of the present disclosure, standardizing the input text further may include lemmatizing each of the plurality of words of the input text and converting each of the plurality of words of the input text to non-gerund form.

In another aspect of the present disclosure, preprocessing the input text further may include removing at least one of symbols and punctuation from the input text. Preprocessing the input text further may include identifying at least one exception phrase in the input text. Preprocessing the input text further may include and partitioning the input text into a first exception part and a second exception part in response to identifying the at least one exception phrase. Preprocessing the input text further may include determining a rule-based action representation of the first exception part and the second exception part. Preprocessing the input text further may include determining a model-based action representation of the first exception part and the second exception part. Preprocessing the input text further may include determining the final action representation of the input text based at least in part on the rule-based action representation of the first exception part and the second exception part and the model-based action representation of the first exception part and the second exception part.

According to several aspects, a system for language processing for a vehicle is provided. The system includes a perception sensor. The system also includes a controller in electrical communication with the perception sensor. The controller is programmed to extract an input text from a traffic sign using the perception sensor. The input text includes a plurality of words. The controller is further programmed to determine a rule-based action representation of the input text. The controller is further programmed to parse the input text to produce a parsed text. The controller is further programmed to determine a model-based action representation of the parsed text. The controller is further programmed to determine a final action representation of the input text based at least in part on the rule-based action representation and the model-based action representation. The controller is further programmed to take an action based at least in part on the final action representation of the input text.

In another aspect of the present disclosure, to determine the rule-based action representation, the controller is further programmed to extract a temporal condition from the input text. To determine the rule-based action representation, the controller is further programmed to generate a logical negation condition expression based at least in part on a negation term in the input text. To determine the rule-based action representation, the controller is further programmed to determine the rule-based action representation, wherein rule-based action representation includes at least the temporal condition and the logical negation condition expression.

In another aspect of the present disclosure, to parse the input text, the controller is further programmed to standardize the input text to produce a standardized text. Each of a plurality of words of the standardized text is mapped to a corresponding one of the plurality of words of the input text. To parse the input text, the controller is further programmed to determine a standardized part-of-speech tag of each of a plurality of forced words of the plurality of words of the standardized text using a lookup table. To parse the input text, the controller is further programmed to determine a forced part-of-speech tag of each of a plurality of forced words of the plurality of words of the input text based on the standardized part-of-speech tag of the corresponding one of the plurality of forced words of the standardized text. To parse the input text, the controller is further programmed to determine a first plurality of part-of-speech taggings of the input text using a machine learning algorithm. Each of the first plurality of part-of-speech taggings includes a predicted part-of-speech tag for each of the plurality of words of the input text. Each of the first plurality of part-of-speech taggings has a confidence value. To parse the input text, the controller is further programmed to determine a part-of-speech tag of each of the plurality of words of the input text based at least in part on the confidence value of each of the first plurality of part-of-speech taggings and the plurality of forced words.

In another aspect of the present disclosure, to determine the part-of-speech tag of each of the plurality of words of the input text, the controller is further programmed to determine a second plurality of part-of-speech taggings of the input text. The second plurality of part-of-speech taggings is a subset of the first plurality of part-of-speech taggings. The predicted part-of-speech tag of each forced word of the plurality of words of each of the second plurality of part-of-speech taggings is identical to the forced part-of-speech tag of each forced word of the plurality of words of each of the second plurality of part-of-speech taggings. To determine the part-of-speech tag of each of the plurality of words of the input text, the controller is further programmed to generate a dependency parse tree for each of the second plurality of part-of-speech taggings of the input text. To determine the part-of-speech tag of each of the plurality of words of the input text, the controller is further programmed to determine a third plurality of part-of-speech taggings of the input text. The third plurality of part-of-speech taggings is a subset of the second plurality of part-of-speech taggings.

At least one forced word of the plurality of words of each of the third plurality of part-of-speech taggings is a root node of the dependency parse tree. To determine the part-of-speech tag of each of the plurality of words of the input text, the controller is further programmed to determine the part-of-speech tag of each of the plurality of words of the input text based on one of the third plurality of part-of-speech taggings having a highest confidence value.

In another aspect of the present disclosure, to determine the model-based action representation of the parsed text, the controller is further programmed to identify a plurality of action words in the input text. To determine the model-based action representation of the parsed text, the controller is further programmed to process each of the plurality of action words to determine a subject phrase and an object phrase for each of the plurality of action words, where action words closest to the root node of the dependency parse tree are processed first. To determine the model-based action representation of the parsed text, the controller is further programmed to determine the model-based action representation. The model-based action representation includes at least the subject phrase and the object phrase for each of the plurality of action words.

In another aspect of the present disclosure, to process each of the plurality of action words to determine the subject phrase and the object phrase, the controller is further programmed to generate a constituency parse tree of the input text based at least in part on the part-of-speech tag of each of the plurality of words of the input text. To process each of the plurality of action words to determine the subject phrase and the object phrase, the controller is further programmed to compare the one of the plurality of action words to an exclusion list. To process each of the plurality of action words to determine the subject phrase and the object phrase, the controller is further programmed to identify the subject phrase of the one of the plurality of action words using the constituency parse tree in response to determining that the one of the plurality of action words is not in the exclusion list. To process each of the plurality of action words to determine the subject phrase and the object phrase, the controller is further programmed to identify the object phrase of the one of the plurality of action words using the constituency parse tree in response to determining that the one of the plurality of action words is not in the exclusion list. To process each of the plurality of action words to determine the subject phrase and the object phrase, the controller is further programmed to add the subject phrase of the one of the plurality of action words to the exclusion list. To process each of the plurality of action words to determine the subject phrase and the object phrase, the controller is further programmed to add the object phrase of the one of the plurality of action words to the exclusion list.

In another aspect of the present disclosure, the system further includes a display in electrical communication with the controller. To take the action, the controller is further programmed to display a notification to an occupant of the vehicle using the display. The notification includes at least the final action representation of the input text.

According to several aspects, a system for language processing for a vehicle is provided. The system includes a perception sensor, a display, and a controller in electrical communication with the perception sensor and the display. The controller is programmed to extract an input text from a traffic sign using the perception sensor. The input text includes a plurality of words. The controller is further programmed to extract a temporal condition from the input text. The controller is further programmed to generate a logical negation condition expression based at least in part on a negation term in the input text. The controller is further programmed to determine a rule-based action representation. The rule-based action representation includes at least the temporal condition and the logical negation condition expression. The controller is further programmed to parse the input text to produce a parsed text. The controller is further programmed to identify a plurality of action words in the input text. The controller is further programmed to process each of the plurality of action words to determine a subject phrase and an object phrase for each of the plurality of action words. The controller is further programmed to determine a model-based action representation. The model-based action representation includes at least the subject phrase and the object phrase for each of the plurality of action words. The controller is further programmed to determine a final action representation of the input text based at least in part on the rule-based action representation and the model-based action representation. The controller is further programmed to display a notification to an occupant of the vehicle using the display. The notification includes at least the final action representation of the input text.

In another aspect of the present disclosure, to parse the input text, the controller is further programmed to standardize the input text to produce a standardized text. Each of a plurality of words of the standardized text is mapped to a corresponding one of the plurality of words of the input text. To parse the input text, the controller is further programmed to determine a standardized part-of-speech tag of each of a plurality of forced words of the plurality of words of the standardized text using a lookup table. To parse the input text, the controller is further programmed to determine a forced part-of-speech tag of each of a plurality of forced words of the plurality of words of the input text based on the standardized part-of-speech tag of the corresponding one of the plurality of forced words of the standardized text. To parse the input text, the controller is further programmed to determine a first plurality of part-of-speech taggings of the input text using a machine learning algorithm. Each of the first plurality of part-of-speech taggings includes a predicted part-of-speech tag for each of the plurality of words of the input text. Each of the first plurality of part-of-speech taggings has a confidence value. To parse the input text, the controller is further programmed to determine a second plurality of part-of-speech taggings of the input text. The second plurality of part-of-speech taggings is a subset of the first plurality of part-of-speech taggings. The predicted part-of-speech tag of each forced word of the plurality of words of each of the second plurality of part-of-speech taggings is identical to the forced part-of-speech tag of each forced word of the plurality of words of each of the second plurality of part-of-speech taggings. To parse the input text, the controller is further programmed to generate a dependency parse tree for each of the second plurality of part-of-speech taggings of the input text. To parse the input text, the controller is further programmed to determine a third plurality of part-of-speech taggings of the input text. The third plurality of part-of-speech taggings is a subset of the second plurality of part-of-speech taggings. At least one forced word of the plurality of words of each of the third plurality of part-of-speech taggings is a root node of the dependency parse tree. To parse the input text, the controller is further programmed to determine a part-of-speech tag of each of the plurality of words of the input text based on one of the third plurality of part-of-speech taggings having a highest confidence value.

In another aspect of the present disclosure, to process each of the plurality of action words to determine the subject phrase and the object phrase, the controller is further programmed to generate a constituency parse tree of the input text based at least in part on the part-of-speech tag of each of the plurality of words of the input text. To process each of the plurality of action words to determine the subject phrase and the object phrase, the controller is further programmed to compare the one of the plurality of action words to an exclusion list. To process each of the plurality of action words to determine the subject phrase and the object phrase, the controller is further programmed to identify the subject phrase of the one of the plurality of action words using the constituency parse tree in response to determining that the one of the plurality of action words is not in the exclusion list. To process each of the plurality of action words to determine the subject phrase and the object phrase, the controller is further programmed to identify the object phrase of the one of the plurality of action words using the constituency parse tree in response to determining that the one of the plurality of action words is not in the exclusion list. To process each of the plurality of action words to determine the subject phrase and the object phrase, the controller is further programmed to add the subject phrase of the one of the plurality of action words to the exclusion list. To process each of the plurality of action words to determine the subject phrase and the object phrase, the controller is further programmed to add the object phrase of the one of the plurality of action words to the exclusion list.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Accurate interpretation of language (e.g., traffic sign text) is important for safe and reliable driver assistance systems and autonomous driving systems, including, for example, level 3+ autonomous driving systems. The present disclosure offers a new and improved system and method for interpretation of language which is specifically adapted for language (e.g., temporal conditions, logical statements, domain specific terminology, and the like) encountered in vehicle applications.

Figure 1:
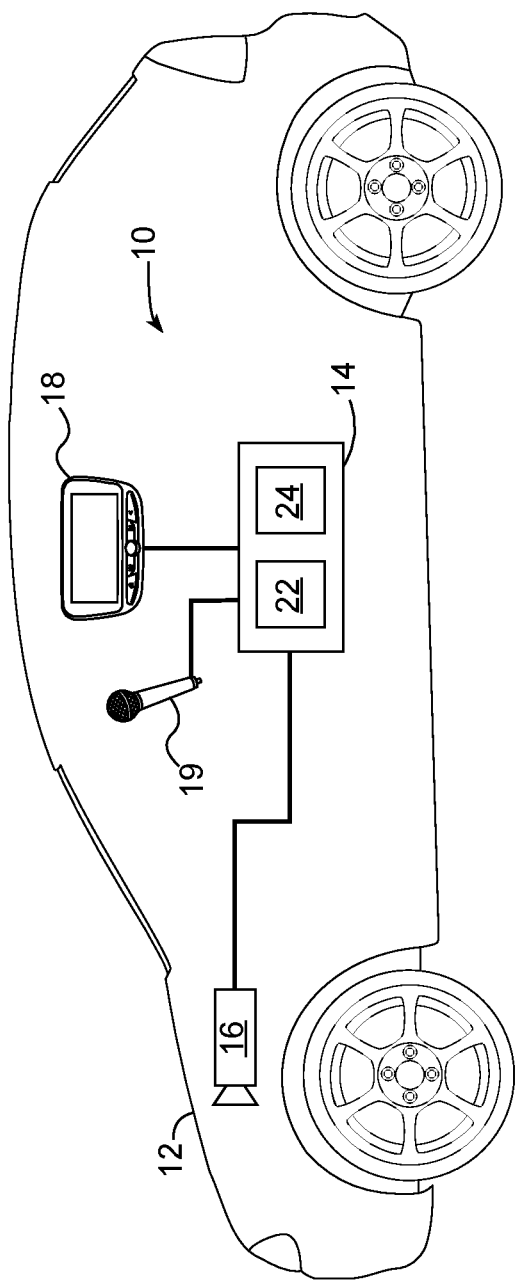
FIG. 1 is a schematic diagram of a system for language processing for a vehicle, according to an exemplary embodiment.

Referring to FIG. 1, a system for language processing for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a perception sensor 16, a display 18, and a microphone 19.

The controller 14 is used to implement a method 100 for language processing for a vehicle, as will be described below. The controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the perception sensor 16, the display 18, and the microphone 19. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The perception sensor 16 is used to gather information about the environment surrounding the vehicle 12. In a non-limiting example, the perception sensor 16 includes, for example, an exterior camera, a surround view camera system, a stereoscopic camera, and/or the like. In the exemplary embodiment shown in FIG. 1, the perception sensor 16 is a surround view camera system. The surround view camera system includes a plurality of cameras (also known as satellite cameras) arranged to provide a view of the environment adjacent to all sides of the vehicle 12. In a non-limiting example, the surround view camera system includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the surround view camera system further includes an additional rear-view camera mounted near a center high mounted stop lamp of the vehicle 12.

It should be understood that surround view camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The display 18 is used to provide information to an occupant of the vehicle 12. In the scope of the present disclosure, the occupant includes a driver and/or a passenger of the vehicle 12. In the exemplary embodiment depicted in FIG. 1, the display 18 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the display 18 is disposed in a rearview mirror are also within the scope of the present disclosure. In another exemplary embodiment, the display 18 includes a head-up display (HUD) configured to provide information to the occupant by projecting text, graphics, and/or images upon the windscreen of the vehicle 12. The text, graphics, and/or images are reflected by the windscreen of the vehicle 12 and are visible to the occupant without looking away from a roadway ahead of the vehicle 12. In another exemplary embodiment, the display 18 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. In an exemplary embodiment, the occupant may interact with the display 18 using a human-interface device (HID), including, for example, a touchscreen, an electromechanical switch, a capacitive switch, a rotary knob, and the like. It should be understood that additional systems for displaying information to the occupant of the vehicle 12 are also within the scope of the present disclosure. The display 18 is in electrical communication with the controller 14 as discussed above.

The microphone 19 is used to receive voice commands by converting acoustic waves into electrical signals. In an exemplary embodiment, the microphone 19 includes a unidirectional dynamic microphone (i.e., a microphone which converts acoustic waves to electrical signals using electromagnetic induction) configured to receive voice commands from a specific occupant of the vehicle 12. In another exemplary embodiment, the microphone 19 includes a plurality of microelectromechanical systems (MEMS) microphones (e.g., a microphone having a pressure-sensitive diaphragm etched directly into a silicon wafer) disposed throughout a cabin of the vehicle 12 configured to receive voice commands. It should be understood that additional types of microphones which are configured to convert acoustic waves to electrical signals (e.g., digital and/or analog electrical signals) are included in the scope of the present disclosure. The microphone 19 is in electrical communication with the controller 14 as discussed above.

Figure 2:
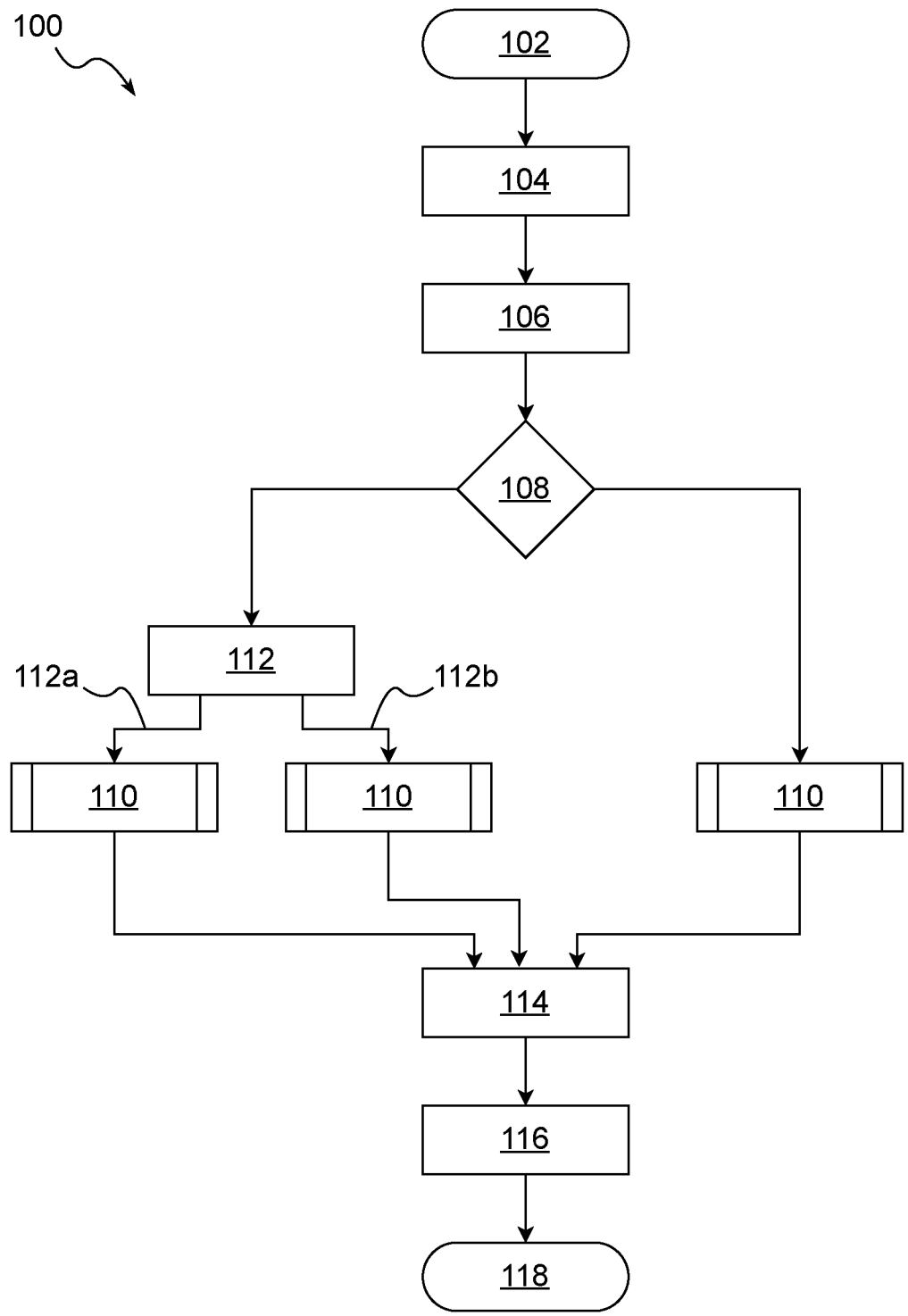
FIG. 2 is a flowchart of a method for language processing for a vehicle, according to an exemplary embodiment.

Referring to FIG. 2, a flowchart of the method 100 for language processing for a vehicle is shown. The method 100 begins at block 102 and proceeds to block 104. At block 104, the controller 14 receives an input text. In the scope of the present disclosure, the input text includes a plurality of words. In an exemplary embodiment, the input text is text from a traffic sign, as captured by the perception sensor 16. In a non-limiting example, the perception sensor 16 captures an image of the traffic sign (e.g., using the exterior camera of the perception sensor 16). The controller 14 then uses computer vision, optical character recognition (OCR), and/or machine learning algorithms to extract the input text from the image of the traffic sign. In another exemplary embodiment, the input text is a spoken command issued by an occupant of the vehicle 12 and received by a microphone (not shown) in electrical communication with the controller 14. The controller 14 then uses a voice recognition algorithm to extract the input text from the spoken command received by the microphone. It should be understood that the input text may be any phrase, sentence, word, and/or group of words to be processed by the method 100. After block 104, the method 100 proceeds to block 106.

At block 106, the input text received at block 104 is preprocessed. In an exemplary embodiment, preprocessing the input text includes removing symbols and punctuation from the input text. The preprocessing step at block 106 prepares the input text for further processing. It should be understood that additional methods of preprocessing, such as, for example, stop word removal, stemming, lemmatization, and the like are within the scope of the present disclosure. After block 106, the method 100 proceeds to block 108.

At block 108, the controller 14 determines whether there is an exception phrase in the input text. In the scope of the present disclosure, the exception phrase is a phrase including a first exception part followed by the word "except" and a second exception part. In a non-limiting example, an exemplary input text is "no right turn except buses". Therefore, the first exception part is "no right turn" and the second exception part is "buses". In an exemplary embodiment, each word in the input text is compared to the word "except" to determine if an exception phrase is present in the input text. It should be understood that determination of the exception phrase based on various additional words or abbreviations having a same or similar meaning to the word "except" is also within the scope of the present disclosure. If the input text does not contain an exception phrase, the method 100 proceeds to block 110. If the input text does contain an exception phrase, the method 100 proceeds to block 112.

At block 110, the input text is processed to produce a machine-readable logical representation of a meaning of the input text, as will be discussed in greater detail below. After block 110, the method 100 proceeds to block 114, as will be discussed in greater detail below.

At block 112, the exception phrase detected at block 108 is split into the first exception part and the second exception part. In an exemplary embodiment, the first exception part includes all words before the word "except" in the input text, and the second exception part includes all words after the word "except" in the input text. Each of the first and second exception parts are processed separately to produce a machine-readable logical representation of a meaning of the first exception part and a machine-readable logical representation of a meaning of the second exception part. Therefore, the arrow 112*a* denotes the first exception part continuing to be processed by block 110, and the arrow 112*b* denotes the second exception part continuing to be processed by block 110. After each of the first and second exception parts are processed separately using block 110, the method 100 proceeds to block 114, as will be discussed in greater detail below.

Figure 3:
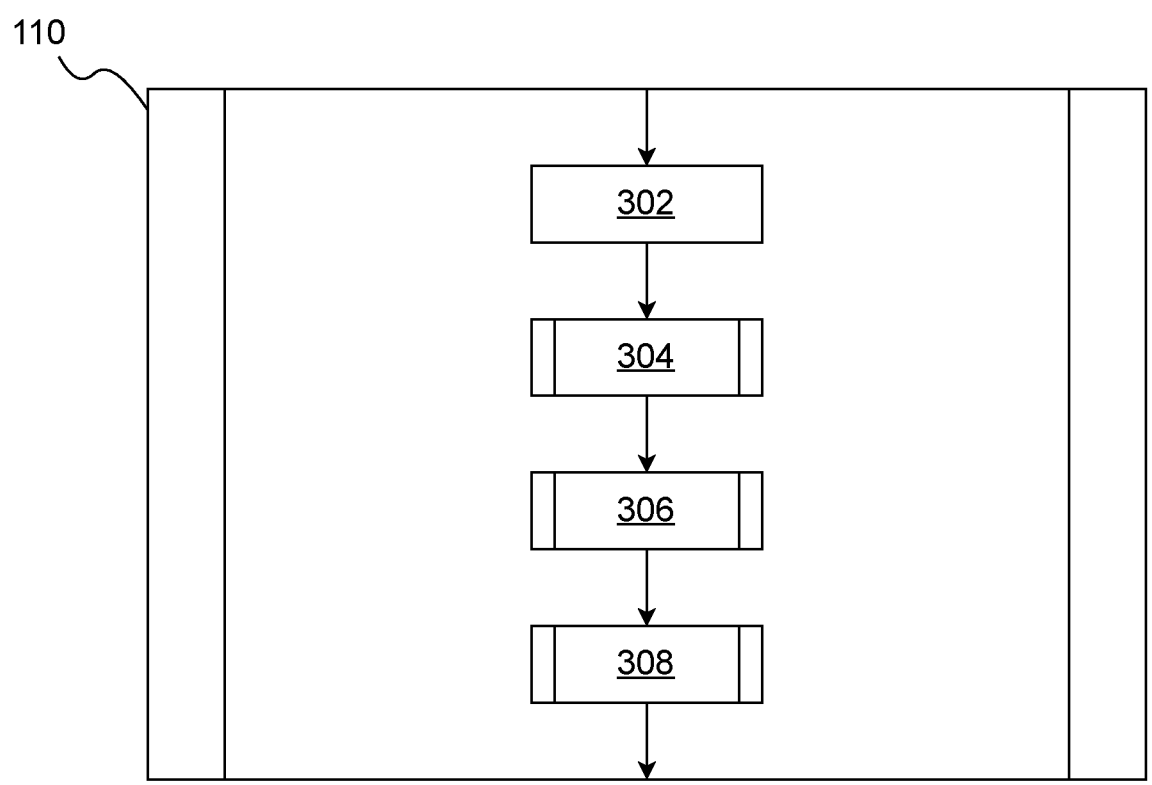
FIG. 3 is a flowchart of a method for producing a machine-readable logical representation of an input text, according to an exemplary embodiment.

Referring to FIG. 3, a flowchart of an exemplary embodiment of block 110 is shown. The exemplary embodiment of block 110 begins at block 302. At block 302, the input text is standardized to produce a standardized text. In an exemplary embodiment, standardizing the input text includes lemmatizing each of the plurality of words of the input text (i.e., transforming each of the plurality of words into a base or dictionary form) and converting each of the plurality of words of the input text to non-gerund form (i.e., changing each verb ending in "-ing" to the verb's base or infinitive form). Furthermore, standardization includes producing a token mapping between each word in the standardized text and a word in the input text. In other words, each of the plurality of words of the standardized text is mapped to a corresponding one of the plurality of words of the input text. In a non-limiting example, the standardized text is stored in the media 24 of the controller 14. After block 302, the exemplary embodiment of block 110 proceeds to block 304.

At block 304, the controller 14 determines a rule-based action representation of the input text, as will be discussed in greater detail below. After block 304, the exemplary embodiment of block 110 proceeds to block 306.

At block 306, the controller 14 parses the input text to produce a parsed text, as will be discussed in greater detail below. After block 306, the exemplary embodiment of block 110 proceeds to block 308.

At block 308, the controller 14 determines a model-based action representation of the parsed text produced at block 306, as will be discussed in greater detail below. After block 308, the exemplary embodiment of block 110 is concluded and the method 100 proceeds as discussed above.

Figure 4:
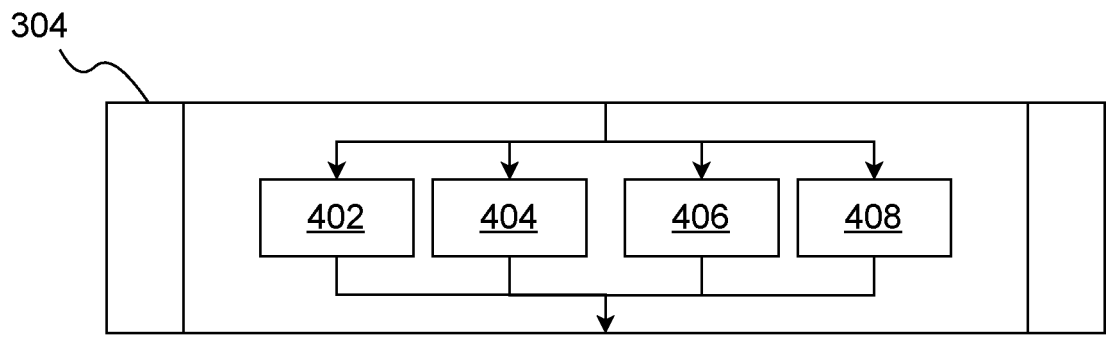
FIG. 4 is a flowchart of a method for determining a rule-based action representation of an input text, according to an exemplary embodiment.

Referring to FIG. 4, a flowchart of an exemplary embodiment of block 304 is shown. The exemplary embodiment of block 304 begins at blocks 402, 404, 406, and 408. At block 402, the controller 14 extracts a temporal condition from the input text. In the scope of the present disclosure, a temporal condition includes a phrase which describes temporal conditions or restrictions in the input text. For example, phrases such as: "between 1 and 2 pm", "Monday-Friday", "on weekends", and/or combinations of the like are examples of temporal conditions.

In an exemplary embodiment, the input text is analyzed using a rule-based analysis to identify the temporal condition(s) in the input text. In the scope of the present disclosure, a rule-based analysis is an analysis which analyzes the input text based on a predetermined set of rules. In a non-limiting example, each word and/or symbol in the input text is compared to a predetermined database or lookup table of words and/or symbols known to denote temporal conditions (e.g., "between", "after", "on", "am", "pm", days of the week, months of the year, and/or the like) in order to identify the temporal condition.

In an exemplary embodiment, a time, day, and duration is extracted from the input text using regular expressions. In a non-limiting example, a first regular expression:

$$\b\d\{1,2\} - ?\d\{0,2\}(?:am|pm)\b \qquad (1)$$

could be used to extract the time from the following exemplary input text: "2-hour parking Monday between 1-3 pm". In another non-limiting example, a second regular expression:

$$\b(Monday|Tuesday|Wednesday|Thursday|Friday|Saturday|Sunday)\b \qquad (2)$$

could be used to extract the day from the aforementioned exemplary input text. In another non-limiting example, a third regular expression:

$$\b\d + (-)\s*(?:hour|minute|day)s?\b \qquad (3)$$

could be used to extract the duration from the aforementioned exemplary input text. It should be understood that the first, second, and third regular expressions are merely exemplary in nature, and that various additional regular expressions may be used to extract the time, day, and duration from the input text within the scope of the present disclosure.

The temporal condition is generated based on the time, day and duration extracted from the input text. In an exemplary embodiment, the temporal condition is a combination of the time, day, and duration using logical operators (e.g., "OR" and "AND"). In some examples, the input text may contain multiple temporal conditions having the same temporal units (e.g., minutes, hours, days, etc.). For example, the input text may include "no parking, 7-9 am, 8-10 pm". If two temporal conditions in the input text have the same temporal unit, they are combined using a logical "OR" (e.g., "7-9 am OR 8-10 pm"). If two temporal conditions in the input text have different temporal units, they are combined using a logical "AND" (e.g., "Monday AND 1-3 pm"). After block 402, the exemplary embodiment of block 304 is concluded and the exemplary embodiment of block 110 proceeds as discussed above.

At block 404, the controller 14 extracts a speed limit from the input text by matching the term "speed limit" from the input text. In an exemplary embodiment, a fourth regular expression:

$$(? \leq \text{speed limit})\d+ \qquad (4)$$

could be used to extract the speed limit from input text. It should be understood that the fourth regular expression is merely exemplary in nature, and that various additional regular expressions may be used to extract the speed limit from the input text within the scope of the present disclosure. After block 404, the exemplary embodiment of block 304 is concluded and the exemplary embodiment of block 110 proceeds as discussed above.

At block 406, the controller 14 generates a logical negation condition expression based at least in part on a negation term in the input text. In the scope of the present disclosure, the logical negation condition expression is a Boolean variable which indicates whether the input text contains a negation. Therefore, if the logical negation condition expression is "true", there is a negation present. If the logical negation condition expression is "false", there is no negation present. The logical negation condition expression is used to determine the final action representation of the input text at block 114 as will be discussed in greater detail below. In the scope of the present disclosure, the negation term is a word in the input text which indicates a negation (e.g., "not", "no", "don't", and/or the like). In an exemplary embodiment, the negation term is identified in the input text by comparing each word in the input text to a database of negation terms. In another exemplary embodiment, the negation term is identified in the input text using a regular expression. After block 406, the exemplary embodiment of block 304 is concluded and the exemplary embodiment of block 110 proceeds as discussed above.

At block 408, the controller 14 identifies special predicate terms in the input text. In the scope of the present disclosure, special predicate terms are terms which take logical expressions as arguments. In a non-limiting example, special predicate terms include: "prepare" and "permitted". For example, an exemplary input text may be: "prepare to stop on red". Therefore, in the exemplary input text, the special predicate term "prepare" takes the logical expression "stop on red" as an argument. The special predicate terms are used to determine the final action representation of the input text at block 114 as will be discussed in greater detail below. After block 408, the exemplary embodiment of block 304 is concluded and the exemplary embodiment of block 110 proceeds as discussed above.

Figure 5:
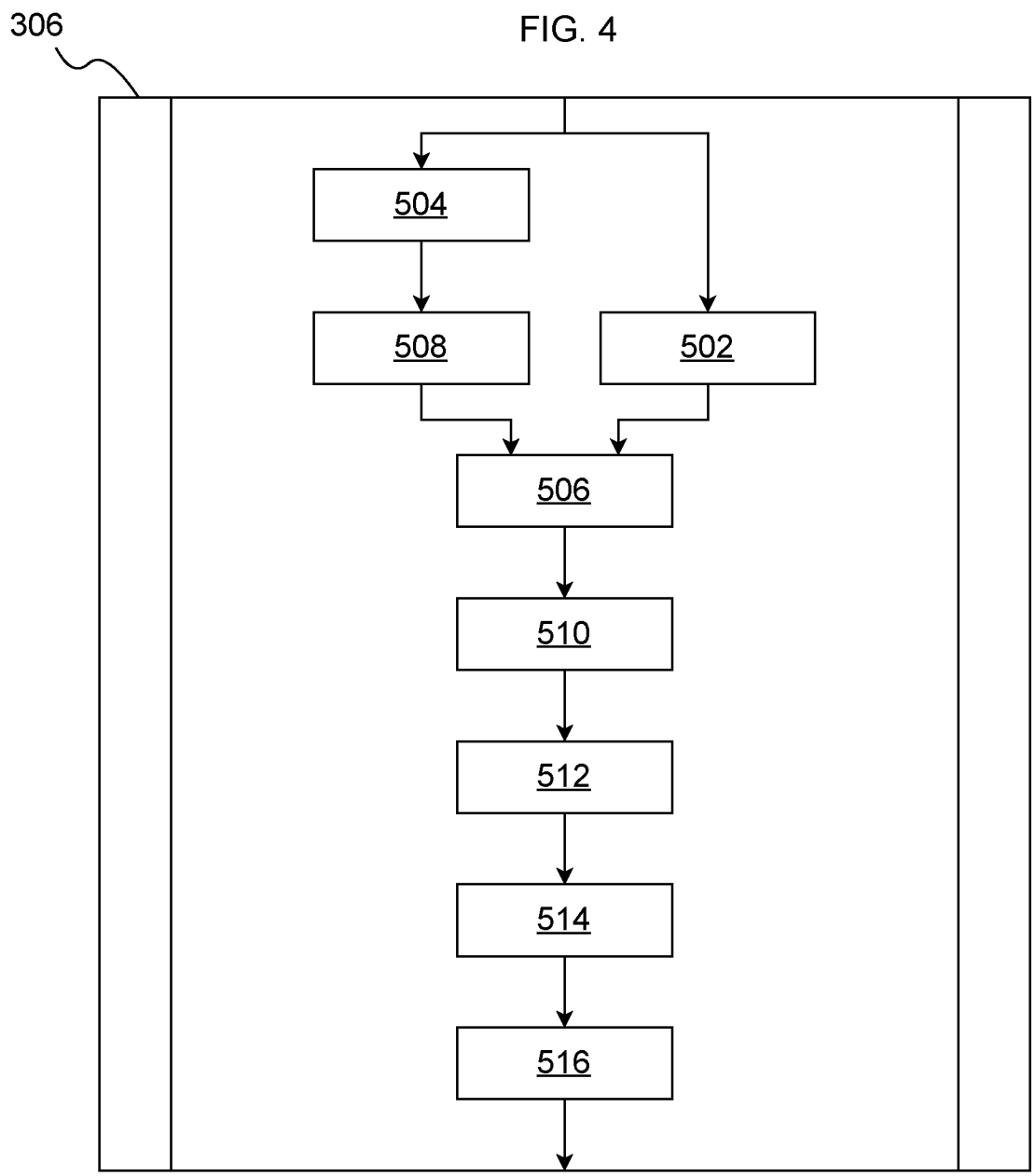
FIG. 5 is a flowchart of a method for parsing an input text, according to an exemplary embodiment.

Referring to FIG. 5, a flowchart of an exemplary embodiment of block 306 is shown. The exemplary embodiment of block 306 begins at blocks 502 and 504. At block 502, the controller 14 determines a first plurality of part-of-speech taggings of the input text. In the scope of the present disclosure, a part-of-speech tagging is a set of predicted part-of-speech tags (e.g., noun, verb, adjective, adverb, etc.), one predicted part-of-speech tag for each of the plurality of words of the input text. In some embodiments, one or more words of the input text may be understood as having a different part-of-speech tag depending on context. Therefore, it is possible to determine a plurality of part-of-speech taggings for a single input text. In an exemplary embodiment, the first plurality of part-of-speech taggings is determined using a machine learning algorithm (also known as a probabilistic neural parser). In a non-limiting example, the machine learning algorithm is trained by providing the algorithm with a plurality of input texts wherein each word of each of the plurality of input texts which have been pre-tagged. After sufficient training of the machine learning algorithm, the algorithm can generate part-of-speech taggings for an input text. In a non-limiting example, the machine learning algorithm further produces a confidence value for each of the plurality of part-of-speech taggings. The confidence value is a numerical estimate of how likely it is that a given part-of-speech tagging of the first plurality of part-of-speech taggings is correct. After block 502, the exemplary embodiment of block 306 proceeds to block 506 as will be discussed below.

At block 504, the controller 14 determines a standardized part-of-speech tag (e.g., noun, verb, adjective, adverb, etc.) for a subset of the plurality of words of the standardized text produced at block 302. The subset of the plurality of words of the standardized text is referred to as a plurality of forced words. In an exemplary embodiment, the standardized part-of-speech tag is determined using a lookup table (LUT). The LUT has one key column (i.e., the one key column containing a plurality of words) and one value column (i.e., the one value column containing the standardized part-of-speech tag for each of the plurality of words). In an exemplary embodiment, the LUT includes a plurality of rows, each of the plurality of rows mapping a word the key column to the standardized part-of-speech tag in the value column. The LUT is stored in the media 24 of the controller 14. Therefore, each word in the standardized text is compared to the key column of each row of the LUT. If a given word in the standardized text is present in the key column of one of the rows of the LUT, the given word is determined to be one of the plurality of forced words and the standardized part-of-speech tag is determined based on the corresponding value in the LUT. An exemplary LUT including forced words and standardized part-of-speech tags is shown below in Table 1. After block 504, the exemplary embodiment of block 306 proceeds to block 508.

TABLE 1 exemplary LUT including forced words and standardized part-of-speech tags.

| KEY | VALUE |
|---|---|
| yield | verb |
| stop | verb |
| left | noun |

At block 508, a forced part-of-speech tag of each of a plurality of forced words of the input text is determined. As discussed above in reference to block 302, each of the plurality of words of the standardized text is mapped to a corresponding one of the plurality of words of the input text. Therefore, each of the plurality of forced words of the input text corresponds to one of the plurality of forced words of the standardized text, as determined at block 504. In other words, for a given word of the input text, if the corresponding word of the standardized text is a forced word, the given word of the input text is determined to be one of the plurality of forced words of the input text. The forced part-of-speech tag of each of the plurality of forced words of the input text is determined to be the same as the standardized part-of-speech tag of the corresponding one of the plurality of forced words of the standardized text, as determined at block 504. After block 508, exemplary embodiment of block 306 proceeds to block 506.

At block 506, the controller 14 determines a second plurality of part-of-speech taggings of the input text. In an exemplary embodiment, the second plurality of part-of-speech taggings is a subset of the first plurality of part-of-speech taggings including only part-of-speech taggings wherein the predicted part-of-speech tag of each of the plurality of forced words in the input text is identical to the forced part-of-speech tag. In a non-limiting example, if a given one of the first plurality of part-of-speech taggings determines the predicted part-of-speech tag of the word "left" to be a verb, the given one of the first plurality of part-of-speech taggings is not included in the second plurality of part-of-speech taggings because the predicted part-of-speech tag of the forced word "left" is not identical to the forced part-of-speech tag of the forced word "left" (see Table 1 above). Therefore, at block 506, for each one of the first plurality of part-of-speech taggings determined at block 502, the predicted part-of-speech tag of each forced word is compared to the forced part-of-speech tag of each forced word determined at block 508 to determine whether the one of the first plurality of part-of-speech taggings will be included in the second plurality of part-of-speech taggings. After block 506, the exemplary embodiment of block 306 proceeds to block 510.

At block 510, the controller 14 generates a dependency parse tree for each of the second plurality of part-of-speech taggings determined at block 506. In the scope of the present disclosure, a dependency parse tree is a tree-like representation of the grammatical structure of the input text. Each word of the input text is represented as a node in the dependency parse tree. Relationships between words are represented as directed edges. A root node of the dependency parse tree is a main verb or predicate of the input text. The dependency parse tree for each of the second plurality of part-of-speech taggings is generated based on the predicted part-of-speech tag for each word in the input text. In an exemplary embodiment, to generate a dependency parse tree, the words in the input text are processed in order, starting with the root node of the tree, which is the main verb or predicate of the input text. The root node is placed at the top of the tree, and all other words in the input text are linked to it based on their grammatical relationships. It should be understood that the dependency parse tree may be generated by a machine learning algorithm which has been trained to generate dependency parse trees. In a non-limiting example, the machine learning algorithm used to generate the dependency parse tree is trained using supervised learning. The resulting structure is a hierarchical tree that represents the dependencies between the words in the sentence. Each dependency is represented by a directed edge between two nodes in the tree.

In a non-limiting example, to generate a dependency parse tree from an exemplary input text: "yield to merging traffic," dependency relationships between the words are first identified. "Yield" is the root of the tree since it is the main verb in the exemplary input text. "To" attaches to "yield" as a preposition, indicating that "merging traffic" is the object of the preposition. "Merging" attaches to "traffic" as an adjective, indicating that it modifies "traffic." Finally, the resulting dependency parse tree is drawn, with "yield" as the root of the tree, "to" as a child of "yield," "merging" as a child of "traffic," and "traffic" as a child of "to." The resulting dependency parse tree shows the hierarchical relationship between the words in the exemplary input text. After block 510, the exemplary embodiment of block 306 proceeds to block 512.

At block 512, the controller 14 determines a third plurality of part-of-speech taggings of the input text. In an exemplary embodiment, the third plurality of part-of-speech taggings is a subset of the second plurality of part-of-speech taggings. At least one forced word of the plurality of words of each of the third plurality of part-of-speech taggings is the root node of the dependency parse tree generated at block 510. In other words, each of the third plurality of part-of-speech taggings is one of the second plurality of part-of-speech taggings having one of the plurality of forced words as the root of the dependency tree as determined at block 510. After block 512, the exemplary embodiment of block 306 proceeds to block 514.

At block 514, the controller 14 determines a part-of-speech tag of each of the plurality of words of the input text based on the third plurality of part-of-speech taggings. In an exemplary embodiment, the part-of-speech tag of each of the plurality of words of the input text is the predicted part-of-speech tag of one of the third plurality of part-of-speech taggings having a highest confidence value, as determined at block 502. After block 514, the exemplary embodiment of block 306 proceeds to block 516.

At block 516, the controller 14 generates a constituency parse tree of the input text based at least in part on the part-of-speech tag of each of the plurality of words of the input text determined at block 514. In the scope of the present disclosure, a constituency parse tree is a hierarchical structure which represents a grammatical structure of the input text in terms of constituent phrases. The constituency parse tree breaks down the input text into grammatical units, such as noun phrases, verb phrases, prepositional phrases, and the like. By analyzing the structure of the constituency parse tree, it is possible to determine a subject phrase, which is a noun phrase that appears before a verb, and an object phrase, which is a noun phrase that appears after a verb. In a non-limiting example, the constituency parse tree for the exemplary input text: "yield to merging traffic" would show "yield" as the root of the tree, with the prepositional phrase "to merging traffic" serving as the object phrase. The subject phrase, which in this case is implied and not explicitly stated, would be the entity or person performing the action of yielding, such as the occupant of the vehicle 12. After block 516, the exemplary embodiment of block 306 is concluded, and the exemplary embodiment of block 110 proceeds as described above.

Figure 6:
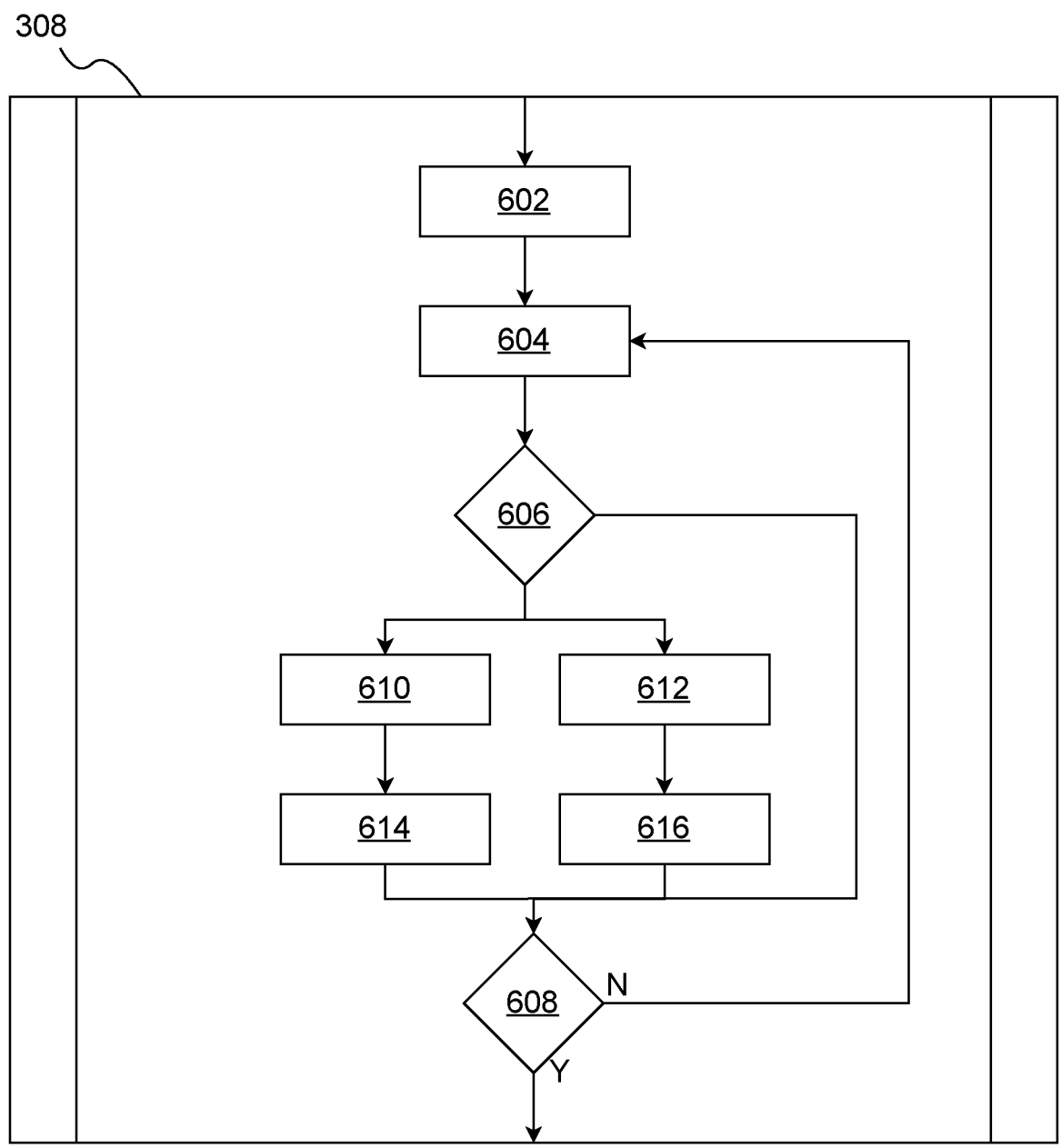
FIG. 6 is a flowchart of a method for determining a model-based action representation of an input text, according to an exemplary embodiment.

Referring to FIG. 6, a flowchart of an exemplary embodiment of block 308 is shown. The exemplary embodiment of block 308 begins at block 602. At block 602, the controller 14 identifies a plurality of action words in the input text. In the scope of the present disclosure, an action word is a word which denotes an action which is to be taken by the occupant of the vehicle 12, an autonomous planning system of the vehicle 12, remote vehicles, pedestrians, and/or other road users. In an exemplary embodiment, the plurality of action words in the input text includes all words having a part-of-speech tag of verb as determined at block 306 as discussed above. In another exemplary embodiment, the media 24 of the controller 14 contains a list of predetermined action words. Each word in the input text is compared to the list of predetermined action words to determine whether a given word in the input text is an action word. In an exemplary embodiment, the standardized text produced at block 302 is used to compare with the list of predetermined action words and determine whether each word in the input text is an action word. After block 602, exemplary embodiment of block 308 proceeds to block 604.

At block 604, the controller 14 selects one of the plurality of action words identified at block 602. In an exemplary embodiment, the selected one of the plurality of action words is one of the plurality of action words closest to the root node of the dependency parse tree (as determined at block 510) which has not previously been selected. After block 604, the exemplary embodiment of block 308 proceeds to block 606.

At block 606, the controller 14 compares the selected one of the plurality of action words to an exclusion list. In the scope of the present disclosure, the exclusion list is a list of words and/or groups of words (i.e., phrases) which are excluded from being considered as subject or object phrases, as will be discussed below. If the selected one of the plurality of action words is in the exclusion list, the exemplary embodiment of block 308 proceeds to block 608, as will be discussed in greater detail below. If the selected one of the plurality of action words is not in the exclusion list, the exemplary embodiment of block 308 proceeds to blocks 610 and 612.

At block 610, the controller 14 identifies the subject phrase of the selected one of the plurality of action words based on the constituency parse tree and the dependency parse tree as discussed above in reference to block 516. In a non-limiting example, to identify the subject phrase of the action word "watch" in the exemplary input text: "watch for stopped trucks", the subtree of the action word which contains the subject of the action word is identified (i.e., the occupant of the vehicle 12, which is implied). The subtree of the action word which contains the subject of the action word is the subject phrase of the action word in the exemplary input text. Therefore, the action word "watch" in the exemplary input text has no explicit subject phrase. After block 610, the exemplary embodiment of block 308 proceeds to block 614.

At block 614, the subject phrase of the selected one of the plurality of action words identified at block 610 is appended to the exclusion list. After block 614, the exemplary embodiment of block 308 proceeds to block 608 as will be discussed in greater detail below.

At block 612, the controller 14 identifies the object phrase of the selected one of the plurality of action words based on the constituency parse tree as discussed above in reference to block 516. In a non-limiting example, to identify the object phrase of the action word "watch" in the exemplary input text: "watch for stopped trucks", the subtree of the action word which contains the direct object of the action word is identified (i.e., "stopped trucks"). The subtree of the action word which contains the direct object of the action word is the object phrase of the action word in the exemplary input text. Therefore, the action word "watch" in the exemplary input text has the object phrase "stopped trucks". After block 612, the exemplary embodiment of block 308 proceeds to block 616.

At block 616, the object phrase of the selected one of the plurality of action words identified at block 612 is appended to the exclusion list. Therefore, in the aforementioned non-limiting example, the object phrase "stopped trucks" is appended to the exclusion list. After block 616, the exemplary embodiment of block 308 proceeds to block 608 as will be discussed in greater detail below.

At block 608, if the subject phrase and object phrase of each of the plurality of action words identified at block 602 has not yet been determined, the exemplary embodiment of block 308 returns to block 604 to select another one of the plurality of action words. If the subject phrase and object phrase of each of the plurality of action words identified at block 602 has been determined, the exemplary embodiment of block 308 is concluded and the exemplary embodiment of block 110 proceeds as discussed above.

Referring again to FIG. 2, at block 114, the controller 14 determines a final action representation of the input text. In the scope of the present disclosure, the final action representation is a logical representation of a meaning of the input text which includes consequents and/or conditions. In an exemplary embodiment, the final action representation includes a condition string and a consequent string. The final action representation is a machine-readable expression, such as, for example, a Boolean logical statement, an if-then statement, a truth table, a lookup table, a decision tree, and/or the like. It should be understood that additional representations of the final action representation are within the scope of the present disclosure. In an exemplary embodiment, the final action representation is determined based on the rule-based action representation determined at block 304 and the model-based action representation determined at block 308.

To incorporate the rule-based action representation into the final action representation, the temporal condition determined at block 402 is appended to the condition string and the speed limit determined at block 404 is appended to the consequent string. If the logical negation condition expression determined at block 406 is true, the consequent string is negated (i.e., the consequent string is enclosed by a "NOT" logical operator). If a special predicate term was identified at block 408, the consequent string is enclosed by the special predicate term. For example, if the special predicate term is "prepare", and the consequent string contains "stop", the consequent string is enclosed by the special predicate term in a machine-readable expression as: "prepare(stop)", which can be understood to mean "prepare to stop".

To incorporate the model-based action representation into the final action representation, each of the subject phrases determined at block 610 is appended to the condition string. Each of the object phrases determined at block 612 is appended to the consequent string.

To determine the final action representation, the condition string is concatenated with the consequent string using an implication operator (e.g., →). For example, the expression: "A→B" means "A implies B". For example, for an exemplary input text: "right lane must turn right excluding buses and bikes", the final action representation is: (right lane)&! ((buses)|(bikes))→turn(right).

In a case where an exception phrase was identified at block 108, the final action representation of the input text is constructed as a logical concatenation of the final action representation of the first exception part and the final action representation of the second exception part. In a non-limiting example, the final action representation of the first exception part is concatenated with the final action representation of the second exception part using the following logical equation:

$$F = !B \to A \tag{6}$$

wherein F is the final action representation of the input text, A is the final action representation of the first exception part, and B is the final action representation of the second exception part. After block 114, the method 100 proceeds to block 116.

At block 116, the controller 14 takes an action based at least in part on the final action representation determined at block 114. In an exemplary embodiment, the action includes using the display 18 to display a notification to the occupant of the vehicle 12. In the aforementioned non-limiting example, the notification includes "no parking allowed here" in response to determining that it is Monday and that parking is not allowed based on the final action representation of the input text. In another non-limiting example, the notification includes consequences contained in the input text, such as, for example, "parking here will result in towing at owner's expense". In another exemplary embodiment, the action includes adjusting an operation of an automated driving system (not shown) of the vehicle 12. In a non-limiting example, a routing parameter of the automated driving system is adjusted such that the vehicle 12 does not attempt to park if the day is Monday based on the final action representation of the input text. In yet another exemplary embodiment, the controller 14 uses a vehicle communication system (not shown) to transmit information about the final action representation of the input text to remote vehicles and/or remote systems. After block 116, the method 100 proceeds to enter a standby state at block 118.

The system 10 and method 100 of the present disclosure offer several advantages. The system 10 and method 100 allow for machine-readable representation of novel input texts including complex logical dependencies. Increasing the accuracy of traffic sign text interpretation using the system 10 and method 100 can improve the performance of advanced driver assistance systems and autonomous driving systems.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for language processing for a vehicle, the method comprising:
   receiving an input text, wherein the input text includes a plurality of words;
   determining a rule-based action representation of the input text;
   parsing the input text to produce a parsed text, wherein parsing the input text further comprises:
      standardizing the input text to produce a standardized text, wherein each of a plurality of words of the standardized text is mapped to a corresponding one of the plurality of words of the input text;
      determining a standardized part-of-speech tag of each of a plurality of forced words of the plurality of words of the standardized text using a lookup table;
      determining a forced part-of-speech tag of each of a plurality of forced words of the plurality of words of the input text based on the standardized part-of-speech tag of the corresponding one of the plurality of forced words of the standardized text;
      determining a first plurality of part-of-speech taggings of the input text using a machine learning algorithm, wherein each of the first plurality of part-of-speech taggings includes a predicted part-of-speech tag for each of the plurality of words of the input text, and wherein each of the first plurality of part-of-speech taggings has a confidence value; and
      determining a part-of-speech tag of each of the plurality of words of the input text based at least in part on the confidence value of each of the first plurality of part-of-speech taggings and the plurality of forced words;
   determining a model-based action representation of the parsed text;
   determining a final action representation of the input text based at least in part on the rule-based action representation and the model-based action representation; and
   taking an action based at least in part on the final action representation, wherein the action includes adjusting a routing parameter of an automated driving system of the vehicle.

2. The method of claim 1, wherein determining the rule-based action representation further comprises:
   extracting a temporal condition from the input text;
   generating a logical negation condition expression based at least in part on a negation term in the input text; and
   determining the rule-based action representation, wherein the rule-based action representation includes at least the temporal condition and the logical negation condition expression.

3. The method of claim 2, wherein extracting the temporal condition from the input text further comprises:
   extracting a time from the input text using a first regular expression;
   extracting a day from the input text using a second regular expression;
   extracting a duration from the input text using a third regular expression; and
   generating the temporal condition based at least in part on the time, day, and duration extracted from the input text.

4. The method of claim 1, wherein determining the part-of-speech tag of each of the plurality of words of the input text based at least in part on the confidence value of each of the first plurality of part-of-speech taggings and the plurality of forced words further comprises:
   determining a second plurality of part-of-speech taggings of the input text, wherein the second plurality of part-of-speech taggings is a subset of the first plurality of part-of-speech taggings, and wherein the predicted part-of-speech tag of each forced word of the plurality of words of each of the second plurality of part-of-speech taggings is identical to the forced part-of-speech tag of each forced word of the plurality of words of each of the second plurality of part-of-speech taggings;
   generating a dependency parse tree for each of the second plurality of part-of-speech taggings of the input text;
   determining a third plurality of part-of-speech taggings of the input text, wherein the third plurality of part-of-speech taggings is a subset of the second plurality of part-of-speech taggings, and wherein at least one forced word of the plurality of words of each of the third plurality of part-of-speech taggings is a root node of the dependency parse tree; and
   determining the part-of-speech tag of each of the plurality of words of the input text based on one of the third plurality of part-of-speech taggings having a highest confidence value.

5. The method of claim 4, wherein determining the model-based action representation of the parsed text further comprises:
   identifying a plurality of action words in the input text;
   processing each of the plurality of action words to determine a subject phrase and an object phrase for each of the plurality of action words, wherein action words closest to the root node of the dependency parse tree are processed first; and
   determining the model-based action representation, wherein the model-based action representation includes at least the subject phrase and the object phrase for each of the plurality of action words.

6. The method of claim 5, wherein processing one of the plurality of action words to determine the subject phrase and the object phrase further comprises:
   generating a constituency parse tree of the input text based at least in part on the part-of-speech tag of each of the plurality of words of the input text;
   comparing the one of the plurality of action words to an exclusion list;
   identifying the subject phrase of the one of the plurality of action words using the constituency parse tree in response to determining that the one of the plurality of action words is not in the exclusion list;
   identifying the object phrase of the one of the plurality of action words using the constituency parse tree in response to determining that the one of the plurality of action words is not in the exclusion list;
   adding the subject phrase of the one of the plurality of action words to the exclusion list; and
   adding the object phrase of the one of the plurality of action words to the exclusion list.

7. The method of claim 1, wherein standardizing the input text further comprises:
   lemmatizing each of the plurality of words of the input text; and
   converting each of the plurality of words of the input text to non-gerund form.

8. The method of claim 1, further comprising preprocessing the input text, wherein preprocessing the input text further comprises:
   removing at least one of: symbols and punctuation from the input text;
   identifying at least one exception phrase in the input text; and
   partitioning the input text into a first exception part and a second exception part in response to identifying the at least one exception phrase;
   determining a rule-based action representation of the first exception part and the second exception part;
   determining a model-based action representation of the first exception part and the second exception part; and
   determining the final action representation of the input text based at least in part on the rule-based action representation of the first exception part and the second exception part and the model-based action representation of the first exception part and the second exception part.

9. A system for language processing for a vehicle, the system comprising:
   a perception sensor; and
   a controller in electrical communication with the perception sensor, wherein the controller is programmed to:
      extract an input text from a traffic sign using the perception sensor, wherein the input text includes a plurality of words;
      extract a temporal condition from the input text;
      generate a logical negation condition expression based at least in part on a negation term in the input text;
      determine a rule-based action representation of the input text, wherein the rule-based action representation includes at least the temporal condition and the logical negation condition expression;
      parse the input text to produce a parsed text;
      determine a model-based action representation of the parsed text;
      determine a final action representation of the input text based at least in part on the rule-based action representation and the model-based action representation; and
      take an action based at least in part on the final action representation of the input text.

10. The system of claim 9, wherein to parse the input text, the controller is further programmed to:
   standardize the input text to produce a standardized text, wherein each of a plurality of words of the standardized text is mapped to a corresponding one of the plurality of words of the input text;
   determine a standardized part-of-speech tag of each of a plurality of forced words of the plurality of words of the standardized text using a lookup table;
   determine a forced part-of-speech tag of each of a plurality of forced words of the plurality of words of the input text based on the standardized part-of-speech tag of the corresponding one of the plurality of forced words of the standardized text;
   determine a first plurality of part-of-speech taggings of the input text using a machine learning algorithm, wherein each of the first plurality of part-of-speech taggings includes a predicted part-of-speech tag for each of the plurality of words of the input text, and wherein each of the first plurality of part-of-speech taggings has a confidence value; and
   determine a part-of-speech tag of each of the plurality of words of the input text based at least in part on the confidence value of each of the first plurality of part-of-speech taggings and the plurality of forced words.

11. The system of claim 10, wherein to determine the part-of-speech tag of each of the plurality of words of the input text, the controller is further programmed to:
   determine a second plurality of part-of-speech taggings of the input text, wherein the second plurality of part-of-speech taggings is a subset of the first plurality of part-of-speech taggings, and wherein the predicted part-of-speech tag of each forced word of the plurality of words of each of the second plurality of part-of-speech taggings is identical to the forced part-of-speech tag of each forced word of the plurality of words of each of the second plurality of part-of-speech taggings;
   generate a dependency parse tree for each of the second plurality of part-of-speech taggings of the input text;
   determine a third plurality of part-of-speech taggings of the input text, wherein the third plurality of part-of-speech taggings is a subset of the second plurality of part-of-speech taggings, and wherein at least one forced word of the plurality of words of each of the third plurality of part-of-speech taggings is a root node of the dependency parse tree; and
   determine the part-of-speech tag of each of the plurality of words of the input text based on one of the third plurality of part-of-speech taggings having a highest confidence value.

12. The system of claim 11, wherein to determine the model-based action representation of the parsed text, the controller is further programmed to:
   identify a plurality of action words in the input text;
   process each of the plurality of action words to determine a subject phrase and an object phrase for each of the plurality of action words, wherein action words closest to the root node of the dependency parse tree are processed first; and
   determine the model-based action representation, wherein the model-based action representation includes at least the subject phrase and the object phrase for each of the plurality of action words.

13. The system of claim 12, wherein to process each of the plurality of action words to determine the subject phrase and the object phrase, the controller is further programmed to:
   generate a constituency parse tree of the input text based at least in part on the part-of-speech tag of each of the plurality of words of the input text;
   compare the one of the plurality of action words to an exclusion list;
   identify the subject phrase of the one of the plurality of action words using the constituency parse tree in response to determining that the one of the plurality of action words is not in the exclusion list;
   identify the object phrase of the one of the plurality of action words using the constituency parse tree in response to determining that the one of the plurality of action words is not in the exclusion list;
   add the subject phrase of the one of the plurality of action words to the exclusion list; and
   add the object phrase of the one of the plurality of action words to the exclusion list.

14. The system of claim 9, further comprising a display in electrical communication with the controller, wherein to take the action, the controller is further programmed to:

display a notification to an occupant of the vehicle using the display, wherein the notification includes at least the final action representation of the input text.

15. A system for language processing for a vehicle, the system comprising:

a perception sensor;

a display; and a controller in electrical communication with the perception sensor and the display, wherein the controller is programmed to:

extract an input text from a traffic sign using the perception sensor, wherein the input text includes a plurality of words;

extract a temporal condition from the input text;

generate a logical negation condition expression based at least in part on a negation term in the input text;

determine a rule-based action representation, wherein the rule-based action representation includes at least the temporal condition and the logical negation condition expression;

parse the input text to produce a parsed text;

identify a plurality of action words in the input text;

process each of the plurality of action words to determine a subject phrase and an object phrase for each of the plurality of action words;

determine a model-based action representation, wherein the model-based action representation includes at least the subject phrase and the object phrase for each of the plurality of action words;

determine a final action representation of the input text based at least in part on the rule-based action representation and the model-based action representation; and display a notification to an occupant of the vehicle using the display, wherein the notification includes at least the final action representation of the input text.

16. The system of claim 15, wherein to parse the input text, the controller is further programmed to:

standardize the input text to produce a standardized text, wherein each of a plurality of words of the standardized text is mapped to a corresponding one of the plurality of words of the input text;

determine a standardized part-of-speech tag of each of a plurality of forced words of the plurality of words of the standardized text using a lookup table;

determine a forced part-of-speech tag of each of a plurality of forced words of the plurality of words of the input text based on the standardized part-of-speech tag of the corresponding one of the plurality of forced words of the standardized text;

determine a first plurality of part-of-speech taggings of the input text using a machine learning algorithm, wherein each of the first plurality of part-of-speech taggings includes a predicted part-of-speech tag for each of the plurality of words of the input text, and wherein each of the first plurality of part-of-speech taggings has a confidence value;

determine a second plurality of part-of-speech taggings of the input text, wherein the second plurality of part-of-speech taggings is a subset of the first plurality of part-of-speech taggings, and wherein the predicted part-of-speech tag of each forced word of the plurality of words of each of the second plurality of part-of-speech taggings is identical to the forced part-of-speech tag of each forced word of the plurality of words of each of the second plurality of part-of-speech taggings;

generate a dependency parse tree for each of the second plurality of part-of-speech taggings of the input text;

determine a third plurality of part-of-speech taggings of the input text, wherein the third plurality of part-of-speech taggings is a subset of the second plurality of part-of-speech taggings, and wherein at least one forced word of the plurality of words of each of the third plurality of part-of-speech taggings is a root node of the dependency parse tree; and determine a part-of-speech tag of each of the plurality of words of the input text based on one of the third plurality of part-of-speech taggings having a highest confidence value.

17. The system of claim 16, wherein to process each of the plurality of action words to determine the subject phrase and the object phrase, the controller is further programmed to:

generate a constituency parse tree of the input text based at least in part on the part-of-speech tag of each of the plurality of words of the input text;

compare the one of the plurality of action words to an exclusion list;

identify the subject phrase of the one of the plurality of action words using the constituency parse tree in response to determining that the one of the plurality of action words is not in the exclusion list;

identify the object phrase of the one of the plurality of action words using the constituency parse tree in response to determining that the one of the plurality of action words is not in the exclusion list;

add the subject phrase of the one of the plurality of action words to the exclusion list; and add the object phrase of the one of the plurality of action words to the exclusion list.

\* \* \* \* \*